(12) United States Patent
Swardh et al.

(10) Patent No.: US 8,805,390 B2
(45) Date of Patent: Aug. 12, 2014

(54) DYNAMIC RADIO CAPABILITIES BASED UPON AVAILABLE TRANSPORT BANDWIDTH

(75) Inventors: Richard Swardh, Frisco, TX (US);
David Boltz, Garland, TX (US); Bo Sundstedt, McKinney, TX (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 107 days.

(21) Appl. No.: 13/348,711

(22) Filed: Jan. 12, 2012

(65) Prior Publication Data

US 2013/0095822 A1    Apr. 18, 2013

Related U.S. Application Data

(60) Provisional application No. 61/548,522, filed on Oct. 18, 2011.

(51) Int. Cl.
*H04W 72/00* (2009.01)
*H04W 4/00* (2009.01)

(52) U.S. Cl.
USPC .................... 455/452.1; 455/430; 455/436

(58) Field of Classification Search
USPC ............. 455/450–453, 446, 432.1–444, 455/456.1–457, 509, 12.1, 427–431; 370/329, 330
See application file for complete search history.

(56) References Cited

U.S. PATENT DOCUMENTS

| | | | |
|---|---|---|---|
| 6,526,341 B1* | 2/2003 | Bird et al. | 701/31.4 |
| 7,769,389 B1* | 8/2010 | Mangal et al. | 455/452.1 |
| 2002/0167917 A1* | 11/2002 | Stephenson et al. | 370/319 |
| 2003/0202533 A1* | 10/2003 | Taylor | 370/468 |
| 2004/0092257 A1 | 5/2004 | Chung et al. | |
| 2006/0072502 A1* | 4/2006 | Crandall et al. | 370/329 |
| 2008/0146240 A1* | 6/2008 | Trudeau | 455/445 |
| 2008/0159131 A1* | 7/2008 | Hoeflin et al. | 370/230 |
| 2011/0257819 A1* | 10/2011 | Chen et al. | 701/21 |

FOREIGN PATENT DOCUMENTS

| | | | |
|---|---|---|---|
| EP | 0902553 A2 | 3/1999 | |
| EP | 1050980 A1 | 11/2000 | |
| GB | 2275588 A | 8/1994 | |
| GB | 2303764 A | 2/1997 | |
| WO | WO 2011/080299 A2 | 7/2011 | |

OTHER PUBLICATIONS

"Internet at sea" (http://web.archive.org/web/20110605023451/http://www.marinesatellitesystems.com/index.php?page_id=113), by Marine Satellite Systems, dated Jun. 2011.*
"Maritime VSAT Communications Solutions" by iDirect, dated Jun. 2010.*

* cited by examiner

*Primary Examiner* — Daniel Lai

(57) ABSTRACT

A monitor and control unit is described herein which is associated with a land-based controller (e.g. base station controller) and one or more satellites, where the monitor and control unit is arranged to dynamically configure mobile-based controllers (e.g., radio base stations) located on mobile vessels (e.g., transport vessels, cruise liners) to provide bandwidth (voice and data capabilities) based at least on the number of mobile vessels being served by each of the satellites.

24 Claims, 6 Drawing Sheets

DYNAMIC RADIO CAPABILITIES BASED UPON AVAILABLE TRANSPORT BANDWIDTH

CLAIM OF PRIORITY

This application claims the benefit of U.S. Provisional Application Ser. No. 61/548,522 filed on Oct. 18, 2011. The contents of this document are hereby incorporated by reference herein.

TECHNICAL FIELD

The present invention relates to a monitor and control unit which is associated with a land-based controller (e.g. base station controller) and one or more satellites, where the monitor and control unit is arranged to dynamically configure mobile-based controllers (e.g., radio base stations) located on mobile vessels (e.g., transport vessels, cruise liners) to provide bandwidth (voice and data capabilities) based at least on the number of mobile vessels being served by each of the satellites. In addition, the present invention relates to a method implemented by the monitor and control unit for dynamically configuring the mobile-based controllers located on the mobile vessels (e.g., transport vessels, cruise liners) to provide bandwidth (voice and data capabilities) based at least on the number of mobile vessels being served by each of the satellites.

BACKGROUND

The following abbreviations are herewith defined, at least some of which are referred to within the following description about at least the prior art and/or the present invention.

BSC Base Station Controller
CS Circuit Switched
GSM Global System for Mobile Communications
M2M Machine to Machine
PS Packet Switched
RBS Radio Base Station
VSAT Very Small Aperture Terminal Transport vessels and cruise liners communicate to land based telecommunication systems via satellite links. To obtain near global communication coverage for the transport vessels and cruise liners requires the use of multiple satellites each of which have a satellite region in which there is provided telecommunication services to the transport vessels and cruise liners that are located in the respective satellite region. In practice, a maritime company (e.g., Maersk) will typically purchase the minimal amount of satellite bandwidth which is required to support an estimated number of their transport vessels per satellite region. Then, the acquired regional satellite bandwidth for the given satellite region is shared amongst all of the maritime company's vessels even if all of the maritime company's vessels are currently not located within the given satellite region. This particular situation has undesirable drawbacks as will be explained in more detail next.

The vessels today currently deploy GSM cellular technologies to provide both voice and M2M data communications. In particular, each vessel is equipped with a GSM RBS which communicates with a land-based BSC using the satellite link as a backhaul transport. However, the current GSM RBSs on the vessels contain static configurations that must be defined to fulfill the transport bandwidth requirements when all of the vessels are assumed to be active in a given satellite region. This means that the GSM RBS on each vessel must be configured to generate a maximum bandwidth such that the sum of all individual GSM RBS's currently located within a particular satellite region do not exceed the amount of bandwidth dimensioned for that specific satellite region.

Thus, when all vessels are active within a satellite region, each vessel is allocated a minimal amount of bandwidth. During this time the GSM access solution would be configured to provide limited voice and data capabilities utilizing only the limited amount of transport bandwidth. However, there will be many times when the active number of vessels within a satellite region is much less than the maximum supported number of vessels. In this situation, there will be additional transport bandwidth available to be shared amongst the active vessels, thus allowing for an increased level of GSM voice and data capabilities. However, since the GSM RBS configurations are static these additional GSM voice and data capabilities cannot currently be recognized. Accordingly, there has been and is a need to address this shortcoming and other shortcomings associated with the static configuration of the GSM RBSs located on vessels. This need and other needs are satisfied by the present invention.

SUMMARY

A monitor and control unit and methods for dynamically configuring mobile-based controllers (e.g., GSM RBSs) located on mobile vessels are described in the independent claims of the present application. Advantageous embodiments of the monitor and control unit and the methods have been described in the dependent claims of the present application.

In one aspect, the present invention provides a monitor and control unit associated with a land-based controller and multiple satellites, where each satellite has a satellite region within which there is provided voice and data capabilities to one or more mobile vessels located in the respective satellite region, and where each mobile vessel has a mobile-based controller. In one embodiment, the monitor and control unit is configured to store location information for each satellite region. The monitor and control unit is configured to receive location information for each mobile vessel. The monitor and control unit is configured to analyze the location information for each mobile vessel and the location information for each satellite region to determine a number of mobile vessels located in each satellite region. The monitor and control unit is configured to determine an available transport bandwidth for each mobile vessel in each satellite region. The monitor and control unit is configured to interface with each mobile-based controller located on each mobile vessel through the land-based controller to dynamically configure each mobile-based controller to provide voice and data capabilities based on the respective available transport bandwidth that was determined for the respective mobile vessel. An advantage of the monitor and control unit is that it provides the capability to support additional voice and data capabilities for mobile vessels for the scenarios where all of the supported mobile vessels are not currently active in a satellite region.

In yet another aspect, the present invention provides a method implemented by a monitor and control unit which is associated with a land-based controller and multiple satellites, where each satellite has a satellite region within which there is provided voice and data capabilities to one or more mobile vessels located in the respective satellite region, and where each mobile vessel has a mobile-based controller. In one embodiment, the method comprises the step of storing location information for each satellite region. The method further comprises the step of receiving location information for each mobile vessel. The method further comprises the step of analyzing the location information for each mobile vessel and the location information for each satellite region to determine a number of mobile vessels located in each satellite region. The method further comprises the step of determining an available transport bandwidth for each mobile vessel in each satellite region. The method further comprises the step of interfacing with each mobile-based controller located on each mobile vessel through the land-based controller to dynamically configure each mobile-based controller to provide voice and data capabilities based on the respective available transport bandwidth that was determined for the respective mobile vessel. An advantage of the method is that it provides the capability to support additional voice and data in capabilities for mobile vessels for the scenarios where all of the supported mobile vessels are not currently active in a satellite region.

In still yet another aspect, the present invention provides a method implemented by a monitor and control unit which is associated with a land-based controller and multiple satellites, where each satellite has a satellite region within which there is provided voice and data capabilities to one or more mobile vessels located in the respective satellite region, and where each mobile vessel has a mobile-based controller. In one embodiment, the method comprises the step of receiving location information from one of the mobile vessels. The method further comprises the step of determining if the mobile vessel is already being monitored. If the result of the determining step is no, then initiating a monitoring process which results in dynamically configuring the mobile-based controller of the mobile vessel and other mobile-based controllers of other mobile vessels if any which are located in same satellite region to provide voice and data capabilities based on an available transport bandwidth that was determined for the mobile vessel and the other mobile vessels. If the result of the determining step is yes, then determine if the mobile vessel has an active cellular service. If the mobile vessel does not have an active cellular service, then end the process. If the mobile vessel does have an active cellular service, then determine if the mobile vessel has moved from an old satellite region to a new satellite region. If the mobile vessel has not moved to the new satellite region, then end the process. If the mobile vessel has moved to the new satellite region, then initiate a modifying monitor process which results in (1) dynamically configuring the mobile-based controller of the mobile vessel and other mobile-based controllers of other mobile vessels if any which are located in the new satellite region to provide voice and data capabilities based on an available transport bandwidth that was determined for the mobile vessel and the other mobile vessels if any located in the new satellite region and (2) dynamically configuring the other mobile-based controllers of other mobile vessels if any which are located in the old satellite region to provide voice and data capabilities based on an available transport bandwidth that was determined for the other mobile vessels if any located in the old satellite region. An advantage of the method is that it provides the capability to support additional voice and data capabilities for mobile vessels for the scenarios where all of the supported mobile vessels are not currently active in a satellite region.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
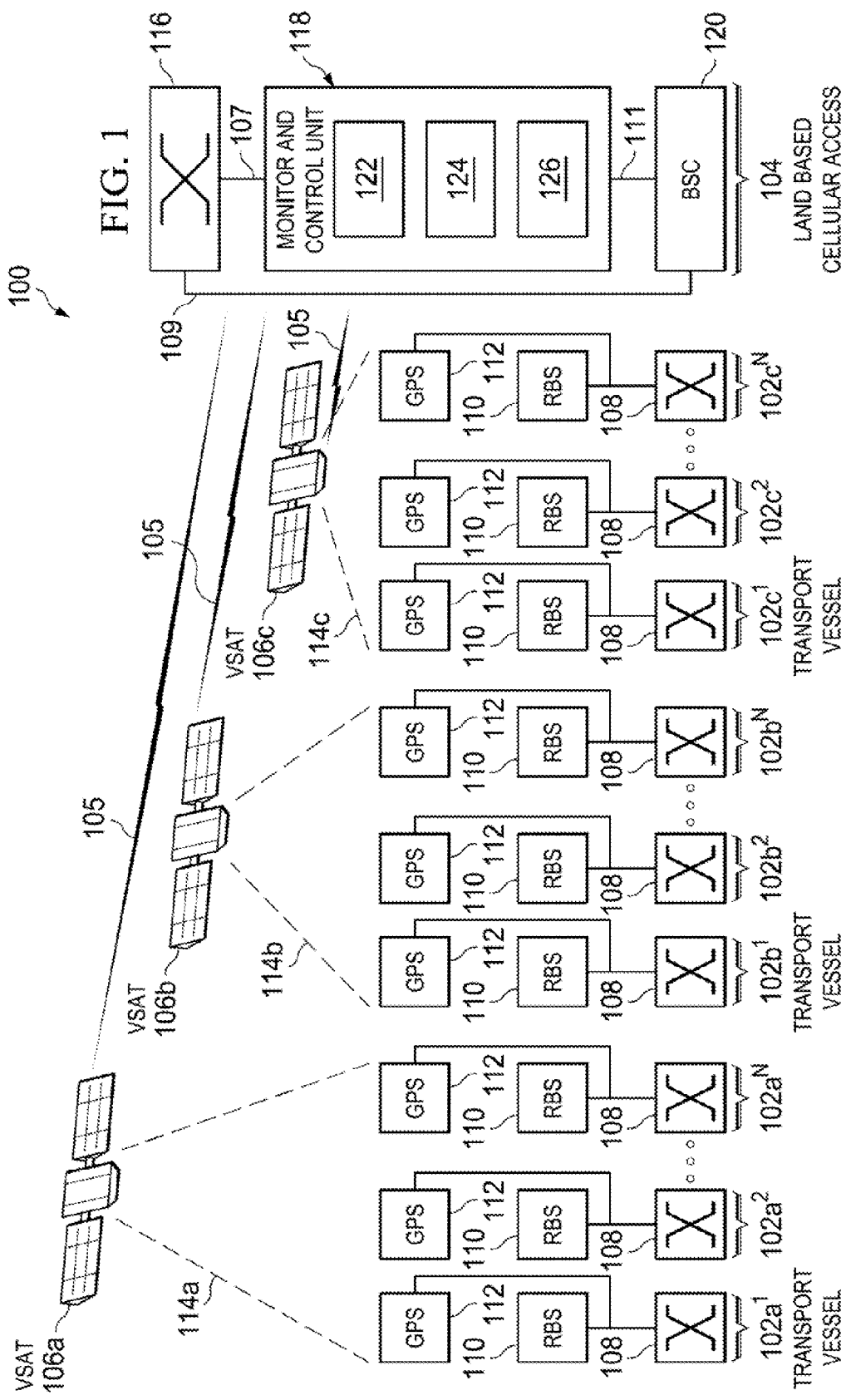
FIG. 1 is a diagram of an exemplary system configured to provide telecommunication services to mobile vessels (e.g., transport vessels, cruise liners) in accordance with an embodiment of the present invention.

Referring to FIG. 1, there is a diagram of an exemplary system 100 configured to provide telecommunication services to mobile vessels 102 (e.g., transport vessels 102, cruise liners 102) in accordance with an embodiment of the present invention. The system 100 includes a land-based cellular access system 104 which interfaces via wireless connections 105 with multiple satellites 106a, 106b and 106c (only three shown) to provide voice and data services to the mobile vessels 102. Each mobile vessel 102 has located thereon a satellite communications modem 108 which is interfaced with a mobile-based controller 110 (e.g., mobile-based RBS 110) and a positioning device 112 (e.g., GPS device 112). In this example, the satellite 106a has a specific satellite region 114a (e.g., satellite footprint 114a, satellite beam 114a) within which there is provided a certain amount of bandwidth for the telecommunication services to the mobile vessels $102a^1$, $102a^2$ ... $102a^n$ currently located within that satellite region 114a. The satellite 106b has a specific satellite region 114b (e.g., satellite footprint 114b, satellite beam 114b) within which there is provided a certain amount of bandwidth for telecommunication services to the mobile vessels $102b^1$, $102b^2$ ... $102b^n$ currently located within that satellite region 114b. The satellite 106c has a specific satellite region 114c (e.g., satellite footprint 114c, satellite beam 114c) within which there is provided a certain amount of bandwidth for telecommunication services to the mobile vessels $102c^1$, $102c^2$ ... $102c^n$ currently located within that satellite region 114c. The satellite regions 114a, 114b and 114c can be contiguous to one another such that anyone of the mobile vessels $102a^1$, $102a^2$ ... $102a^n$ (for example) located in satellite region 114a could move into satellite region 114b (for example) and continue to be provided in an uninterrupted fashion their telecommunication services. In fact, the satellite regions 114a, 114b and 114c may even overlap one another to a certain degree but still provide uninterrupted telecommunication services to mobile vessels $102a^1, 102a^2 \ldots 102a^n$ (for example) that move from one satellite region 114a to satellite region 114b (for example).

The land-based cellular access system 104 interfaces via wireless communications 105 with the satellites 106a, 106b and 106c to provide voice and data services to the mobile vessels 102. In this example, the land-based cellular access system 104 includes a satellite communications modem 116, a monitor and control unit 118 and a land-based controller 120 (e.g., land-based base station controller 120). The satellite communications modem 116 interfaces via wireless connections 105 with the satellites 106a, 106b, and 106c. In addition, the satellite communications modem 116 interfaces via hardwire connections 107 and 109 with the monitor and control unit 118 and the land-based controller 120, respectively. The monitor and control unit 118 also interfaces via a hardwire connection 111 with the land-based controller 120. The monitor and control unit 118 as will be explained below is a marked improvement over the state-of-the-art in that it dynamically configures the mobile-based controllers 110 on the mobile vessels 102 to provide specific voice and data capabilities based upon the number of mobile vessels 102 and the available bandwidth per each satellite region 114a, 114b and 114c. An exemplary way that the monitor and control unit 118 can dynamically configure the mobile-based controllers 110 on the mobile vessels 102 is discussed next with respect to FIG. 2.

Figure 2:
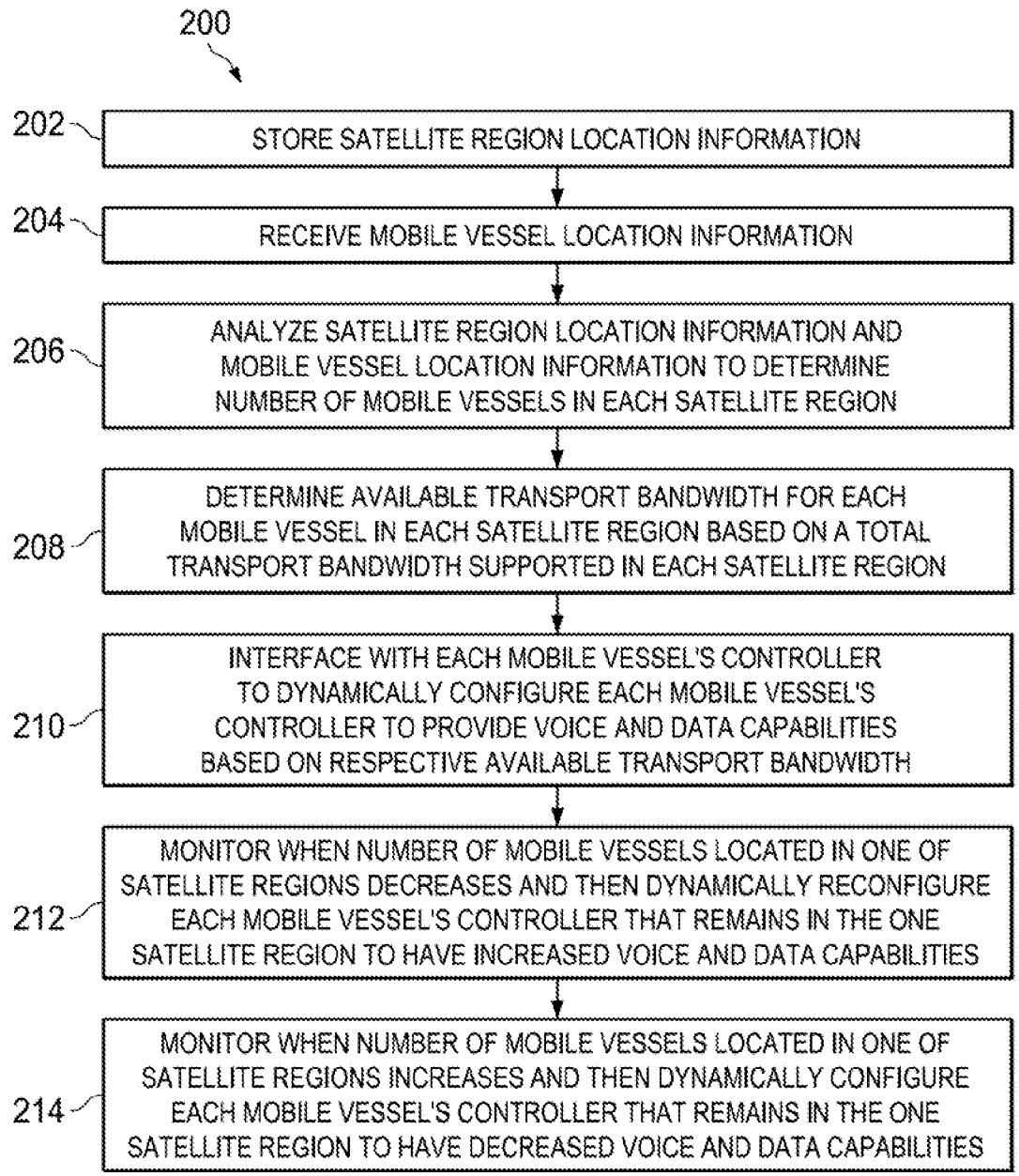
FIG. 2 is a flowchart illustrating the steps of an exemplary method that is implemented by an monitor and control unit shown in FIG. 1 for dynamically configuring the mobile-based controllers located on the mobile vessels in accordance with an embodiment of the present invention.

Referring to FIG. 2, there is a flowchart illustrating the steps of an exemplary method 200 that is implemented by the monitor and control unit 118 to dynamically configure the mobile-based controllers 110 on the mobile vessels 102 in accordance with an embodiment of the present invention. Beginning at step 202, the monitor and control unit 118 is configured to store location information indicating the geographical area that is associated with each satellite region 114a, 114b, and 114c. At step 204, the monitor and control unit 118 is configured to receive location information (e.g., GPS coordinates) from the positioning devices 112 located on each mobile vessel 102. At step 206, the monitor and control unit 118 is configured to analyze the location information for each mobile vessel 102 and the location information for each satellite region 114a, 114b and 114c to determine a number of mobile vessels 102 located in each satellite region 114a, 114b and 114c. At step 208, the monitor and control unit 118 is configured to determine an available transport bandwidth for each mobile vessel 102 in each satellite region 114a, 114b and 114c. For example, the monitor and control unit 118 can be configured to determine the available transport bandwidth for each mobile vessel 102 located in each satellite region 114a, 114b and 114c based on a total transport bandwidth supported in each satellite region 114a, 114b and 114c. In one case, the total transport bandwidth for a specific satellite region 114a, 114b and 114c may be based on the amount of bandwidth that was purchased by a maritime company that operates vessels 102. At step 210, the monitor and control unit 118 is configured to interface with each mobile-based controller 110 located on each mobile vessel 102 through the land-based controller 120 to dynamically configure each mobile-based controller 110 to provide voice and data capabilities based on the respective available transport bandwidth that was determined for the respective mobile vessel 102. At step 212, the monitor and control unit 118 is configured to monitor when a number of mobile vessels 102 located within one of the satellite regions 114a, 114b or 114c decreases and then dynamically reconfigure each mobile-based controller 110 located on each mobile vessel 102 which is remaining within the one satellite region 114a, 114b or 114c to have increased voice and data capabilities. At step 214, the monitor and control unit 118 is configured to monitor when a number of mobile vessels 102 located within one of the satellite regions 114a, 114b or 114c increases then dynamically reconfigure each mobile-based controller 110 located on each mobile vessel 102 which is remaining within the one satellite region 114a, 114b or 114c to have decreased voice and data capabilities. In one implementation, the monitor and control unit 118 can be configured to have a processor 122 and a memory 124 that stores processor-executable instructions wherein the processor 122 interfaces with the memory 124 and executes the processor-executable instructions to perform steps 202, 204, 206, 208, 210, 212, and 214. Further, the mobile vessels 102 described above are assumed to have an active cellular service and if any of them do not have an active cellular service then those mobile vessels are not taken into account when perform steps 206, 208, 210, 212 and 214.

As discussed above, the monitor and control unit 118 and method 200 are configured to monitor the number of active mobile vessels 102 per satellite region 114a, 114b and 114c and then determine the available transport bandwidth for each active mobile vessel 102. Thereafter, the monitor and control unit 118 and method 200 provide dynamic configurations to the mobile-based controllers 110 located on each active mobile vessel 102 to enable robust and efficient transmissions between the vessel's mobile-based controllers 110 and the land-based controller 120. An exemplary way that this can be accomplished is that as the first mobile vessel $102a^1$ (for example) sails into a satellite region 114a (for example) then the mobile and control unit 118 dynamically configures that vessel's mobile-based controller 110 in a manner to provide maximum voice and data capabilities. As more mobile vessels $102a^2 \ldots 102a^n$ sail into the satellite region 114a then the mobile and control unit 118 dynamically configures all of the vessel's mobile based controllers 110 within that satellite region 114a to reduce the voice and data capabilities thus reducing the required transport bandwidth. Once all of the supported mobile vessels $102a^1, 102a^2 \ldots 102a^n$ are within the satellite region 114a, then the configurations of the vessel's mobile-based controllers 110 will be such to provide minimal voice and data capabilities thus fulfilling the total transport bandwidth supported for that particular satellite region 114a. When the number of active mobile vessels $102a^1, 102a^2 \ldots 102a^n$ decreases within the satellite region 114a then the monitor and control unit 118 dynamically reconfigures the mobile-based controllers 110 on the remaining active mobile vessels $102a^2 \ldots 102a^n$ (for example) to provide improved voice and data capabilities. For example, when there is only one active vessel $102a^1$ (for example) in the satellite region 114a (for example) then that vessel's mobile-based controller 110 can be configured to support eight voice calls and a 59.2 kbps bit rate is supported for data communications. But, when the maximum number of active vessels $102a^1, 102a^2 \ldots 102a^n$ are located in the satellite region 114a then each vessel's mobile-based controller 110 can be configured to support one voice call and a 8.8 kbps bit rate is supported for data communications. In contrast, without the present invention then all of the active vessel's $102a^1, 102a^2 \ldots 102a^n$ would be statically configured to support one voice call and a 8.8 kbps bit rate for data communications regardless of how many active mobile vessels $102a^1, 102a^2 \ldots 102a^n$ are located in satellite region 114a.

Figure 3A:
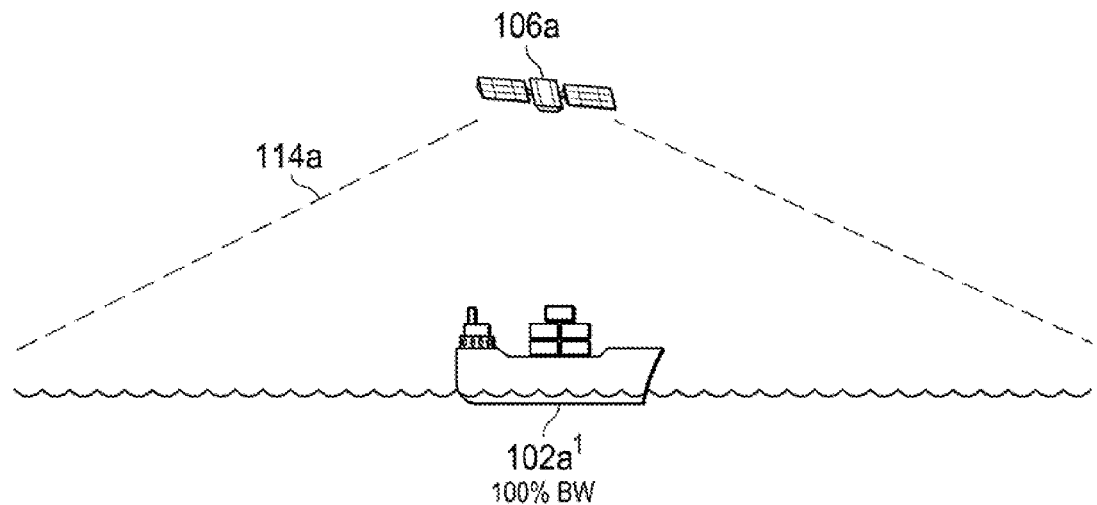
FIGS. 3A-3B are two diagrams which are used to explain how the available transport bandwidth effects the way the monitor and control unit shown in FIG. 1 configures the vessel's mobile-based controllers for an exemplary case where only one supported vessel is in the satellite region and the exemplary case where the maximum number of supported vessels are in the same satellite region in accordance with an embodiment of the present invention.
Figure 3B:
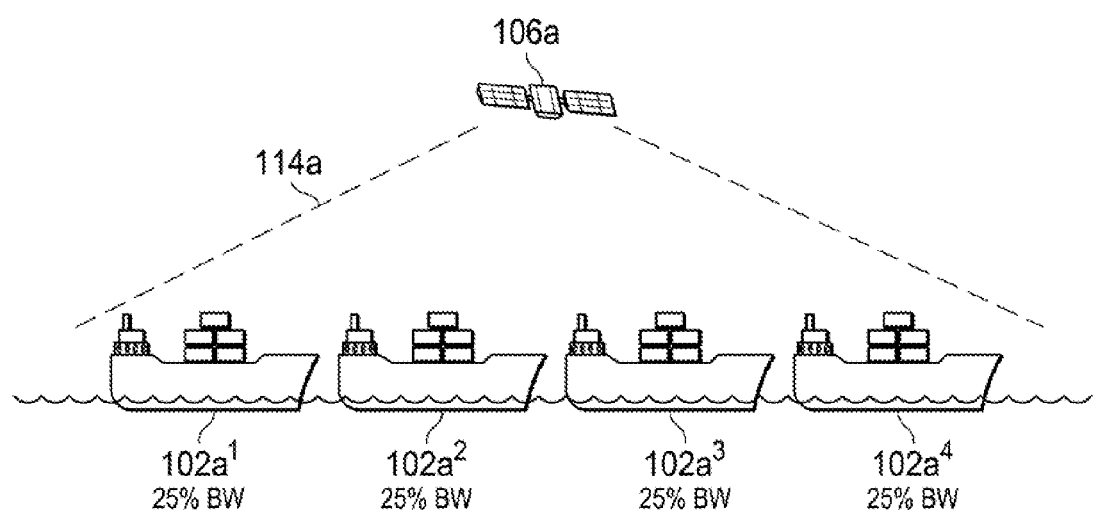

This dynamic reconfiguration process can be realized by having each vessel 102 report its location via GPS coordinates (for example) to the monitor and control unit 118 which is located near the land-based controller 120 (e.g., land-based BSC 120). The monitor and control unit 118 would have a database 126 which contains location information about all of the satellite regions 114a, 114b and 114c and the number of vessels 102 that can be supported by each satellite region 114a, 114b and 114c. The monitor and control unit 118 analyzes the received GPS coordinates to determine the number of vessels 102 located in any given satellite region 114a, 114b and 114c. The monitor and control unit 118 then interfaces with the vessel's mobile-based controllers 110 via the land-based controller 120 to modify the configurations of the vessel's mobile-based controller 110 based upon the number of active vessels 102 within the given satellite region 114a, 114b and 114c. FIGS. 3A-3B illustrate how the available transport bandwidth effects the way the monitor and control unit 118 configures the vessel's mobile-based controllers 110 for an exemplary case where only one vessel $102a^1$ is in the satellite region 114a (for example) and the exemplary case where the maximum number of vessels 102 (four in this case) are in the same satellite region 114a. In this example, the transport company which operates four vessels $102a^1$, $102a^2$, $102a^3$ and $102a^4$ has acquired a certain amount of the bandwidth of satellite 106a such that when there is only one vessel $102a^1$ in the satellite region 114a then the monitor and control unit 118 configures that vessel's mobile-based controller 110 to utilize 100% of the acquired bandwidth (see FIG. 3A). Then, when there are four vessels $102a^1$, $102a^2$, $102a^3$ and $102a^4$ (the maximum) the monitor and control unit 118 configures each of the four vessel's mobile-based controllers 110 to utilize 25% of the acquired bandwidth.

Figure 4A:
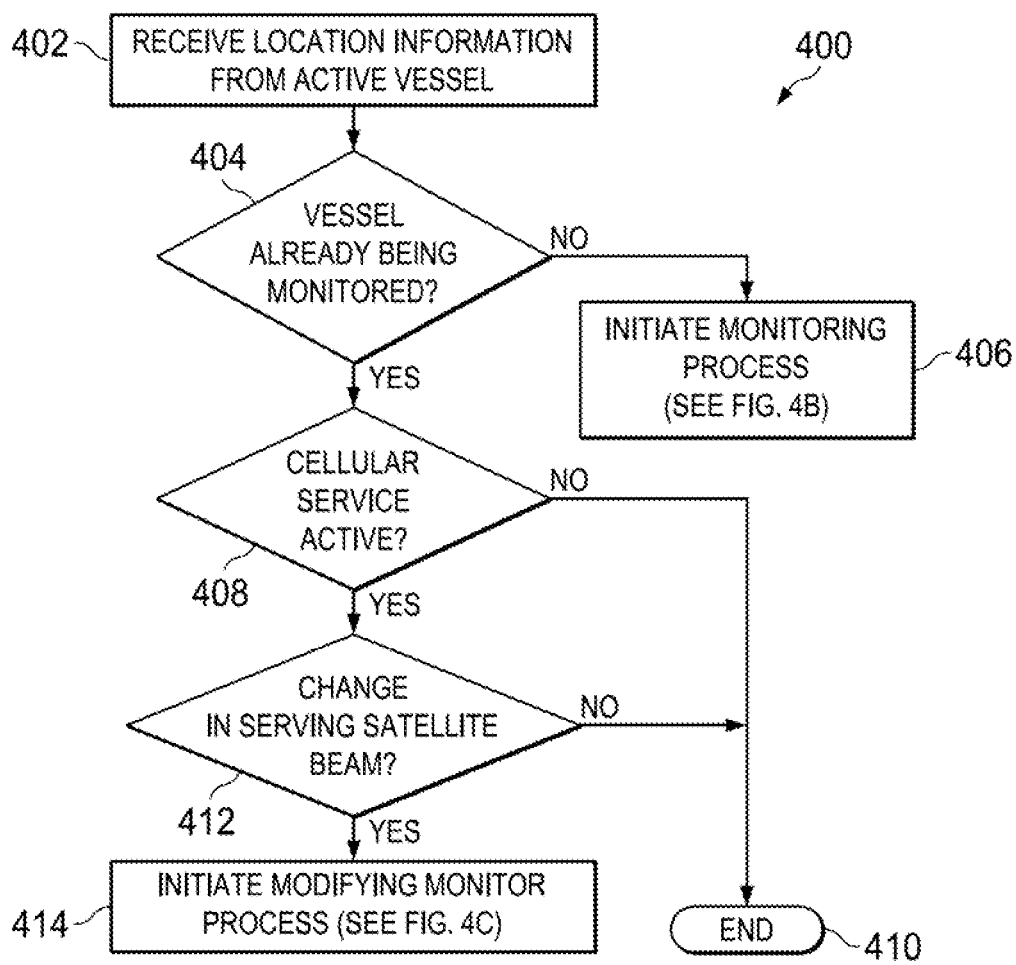
FIGS. 4A-4C are three flowchart illustrating the steps of an exemplary method that is implemented by the monitor and control unit shown in FIG. 1 for dynamically configuring the mobile-based controllers on the mobile vessels in accordance with an embodiment of the present invention.
Figure 4B:
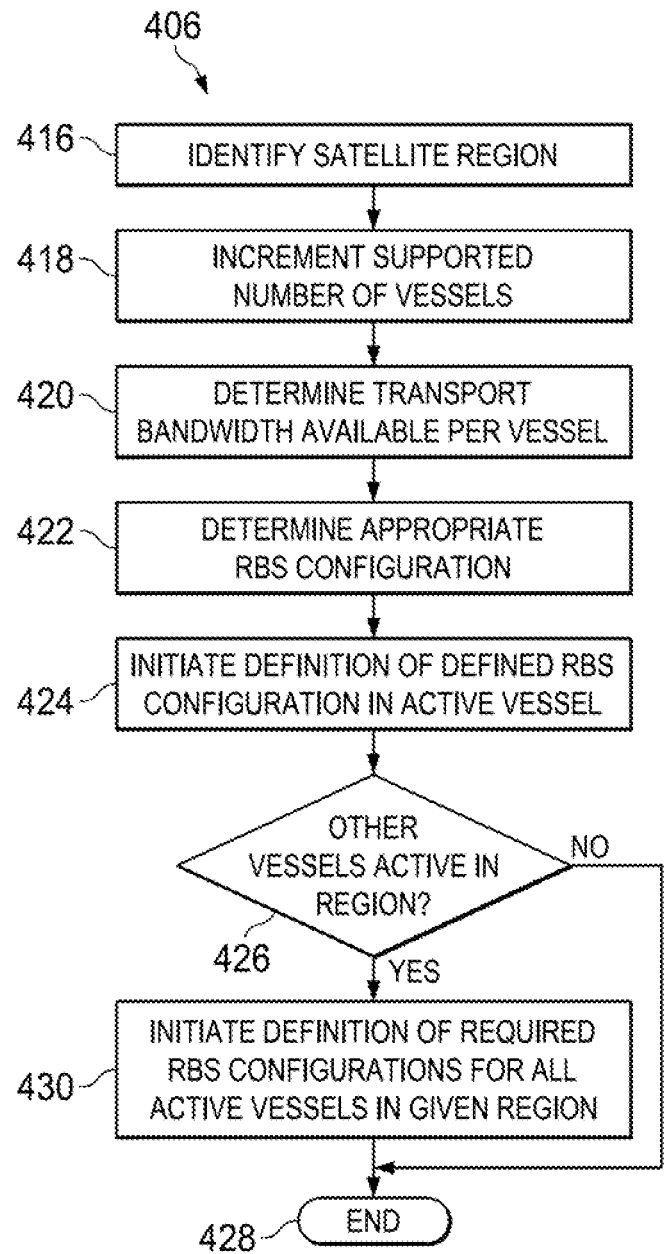
Figure 4C:
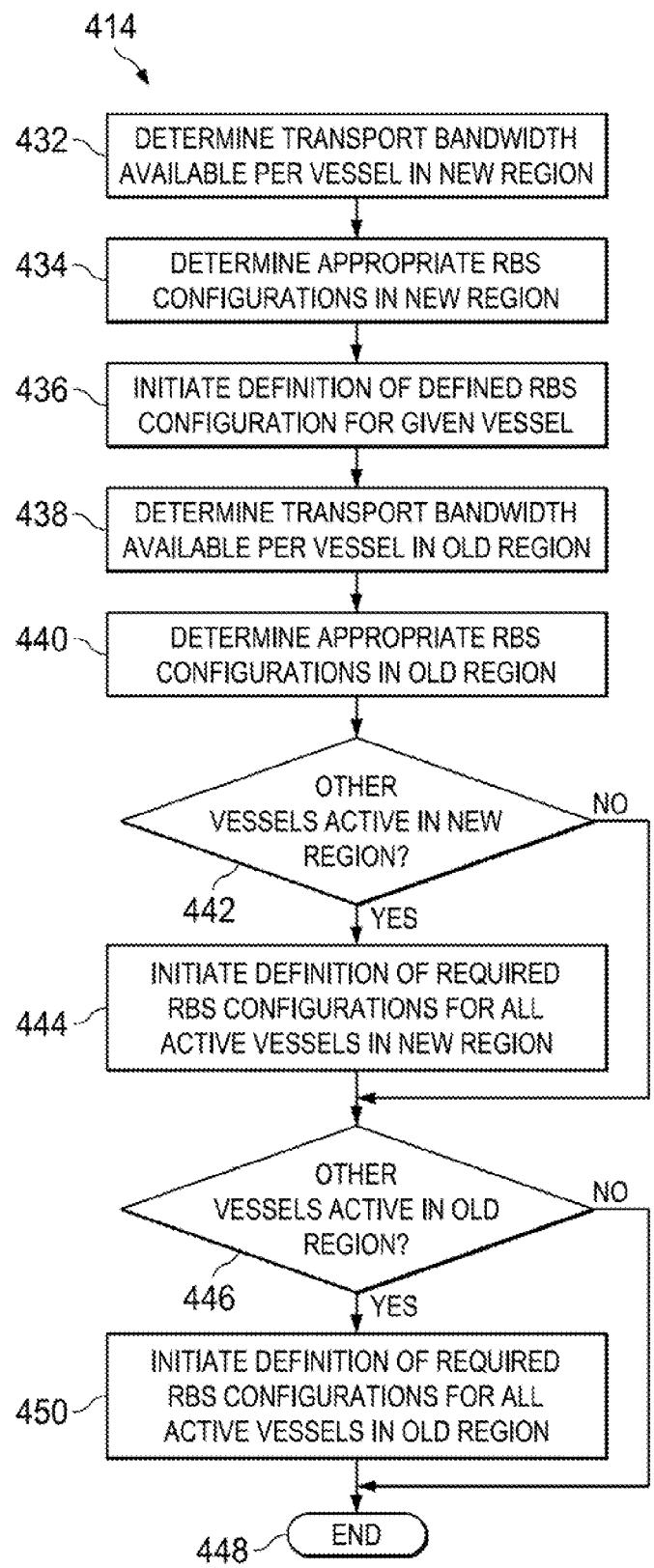

Referring to FIGS. 4A-4C, there are three flowcharts illustrating the steps of an exemplary method 400 that is implemented by the monitor and control unit 118 to dynamically configure the mobile-based controllers 110 on the mobile vessels 102 in accordance with an embodiment of the present invention. At step 402, the monitor and control unit 118 is configured to receive location information GPS coordinates) for a mobile vessel 102 which has located thereon a mobile-based controller 110 and a positioning device 112 (e.g., GPS device 112). At step 404, the monitor and control unit 118 is configured to determine if the mobile vessel 102 is already being monitored. If the result of the determining step 404 is no, then the monitor and control unit 118 is configured to initiate at step 406 a monitoring process which results in dynamically configuring the mobile-based controller 110 of the mobile vessel 102 and other mobile-based controllers 110 of other mobile vessels 102 if any which are located in the same satellite region 114a, 114b or 114c to provide voice and data capabilities based on an available transport bandwidth that was determined for the mobile vessel 102 and the other mobile vessels 102 which are located in the same satellite region 114a, 114b or 114c (see. FIG. 4B for flowchart of an exemplary monitoring process 406). If the result of the determining step 404 is yes, then the monitor and control unit 118 is configured to determine at step 408 if the mobile vessel 102 has an active cellular service. If the result of the second determining step 408 is no, then the monitor and control unit 118 at step 410 ends the process. If the result of the determining step 408 is yes, then the monitor and control unit 118 determines at step 412 if the mobile vessel 102 has a change in the serving satellite beam by moving from an old satellite region 114a (for example) to a new satellite region 114b (for example). If the result of the determining step 412 is no, then the monitor and control unit 118 at step 410 ends the process. If the result of the determining step 412 is yes, then the monitor and control unit 118 is configured to initiate at step 414 a modifying monitor process which results in dynamically configuring the mobile-based controller 110 of the mobile vessel 102 and other mobile-based controllers 110 of other mobile vessels 102 if any which are located in the new satellite region 114b (for example) to provide voice and data capabilities based on an available transport bandwidth that was determined for the mobile vessel 102 and the other mobile vessels 102 if any located in the new satellite region 114b (for example). Furthermore, the monitor and control unit 118 by initiating the modifying monitor process at step 414 will result in dynamically configuring other mobile-based controllers 110 of other mobile vessels 102 if any which are located in the old satellite region 114a (for example) to provide voice and data capabilities based on an available transport bandwidth that was determined for the other mobile vessels 102 if any located in the old satellite region 114a (for example) (see FIG. 4C for flowchart of an exemplary modifying monitor process 414).

Referring to FIG. 4B, there is a flowchart illustrating the steps of an exemplary monitoring process 406 that can be implemented by the monitor and control unit 118 in accordance with an embodiment of the present invention. At step 416, the monitor and control unit 118 is configured to identify the satellite region 114a, 114b or 114c in which the mobile vessel 102 is currently located. At step 418, the monitor and control unit 118 is configured to increment a supported number of mobile vessels 102 in the identified satellite region 114a, 144b or 114c. At step 420, the monitor and control unit 118 is configured to determine the available transport bandwidth for the mobile vessel 102 and the other mobile vessels 102 if any located in the identified satellite region 114a, 114b or 114c. At step 422, the monitor and control unit 118 is configured to determine a configuration for the mobile-based controller 110 of the mobile vessel 102 and the other mobile-based controllers 110 of the other mobile vessels 102 if any located in the identified satellite region 114a, 114b or 114c. At step 424, the monitor and control unit 118 is configured to initiate (dynamically reconfigure) the determined configuration in the mobile-based controller 110 of the mobile vessel 102. At step 426, the monitor and control unit 118 is configured to determine if other mobile vessels 102 are active in the identified satellite region 114a, 114b or 114c. If the result of the determining step 426 is no, then the monitor and control unit 118 is configured to end the process at step 428. If the result of the determining step 426 is yes, then the monitor and control unit 118 is configured at step 430 to initiate (dynamically reconfigure) the determined configuration in the mobile-based controllers 110 of the other mobile vessels 102 which are active in the identified satellite region 114a, 114b or 114c.

Referring to FIG. 4C, there is a flowchart illustrating the steps of an exemplary modifying monitor process 414 that can be implemented by the monitor and control unit 118 in accordance with an embodiment of the present invention. At step 432, the monitor and control unit 118 is configured to determine the available transport bandwidth for the mobile vessel 102 and the other mobile vessels 102 if any located in the new satellite region 114b (for example). At step 434, the monitor and control unit 118 is configured to determine a configuration for the mobile-based controller 110 of the mobile vessel 102 and the other mobile-based controllers 110 of the other mobile vessels 102 if any located in the new satellite region 114b (for example). At step 436, the monitor and control unit 118 is configured to initiate (dynamically reconfigure) the determined configuration in the mobile-based controller 110 of the mobile vessel 102 located in the new satellite region 114b (for example). At step 438, the monitor and control unit 118 is configured to determine the available transport bandwidth for the other mobile vessels 102 if any located in the old satellite region 114a (for example). At step 440, the monitor and control unit 118 is configured to determine a configuration for the other mobile-based controllers 110 of the other mobile vessels 102 if any located in the old satellite region 114a (for example) based on the determined available transport bandwidths. At step 442, the monitor and control unit 118 is configured to determine if the other mobile vessels 102 in the new satellite region 114b (for example) are active. If the result of the determining step 442 is yes, then the monitor and control unit 118 is configured at step 444 to initiate (dynamically reconfigure) the determined configuration in the other mobile-based controllers 110 of the other mobile vessels 102 which are active and located in the new satellite region 114b (for example). If the result of the determining step 442 is no or after performing step 444, the monitor and control unit 118 is configured at step 446 to determine if the other vessels 102 in the old satellite region 114a (for example) are active. If the result of step 446 is no, then the monitor and control unit 118 is configured at step 448 to end the process. If the result of step 446 is yes, then the monitor and control unit 118 is configured at step 450 to initiate (dynamically reconfigure) the determined configuration in the other mobile-based controllers 110 of the other mobile vessels 102 which are active and located in the old satellite region 114a (for example). Thereafter, the monitor and control unit 118 ends the process at step 448. In one implementation, the monitor and control unit 118 can be configured to have a processor 122 and a memory 124 that stores processor-executable instructions wherein the processor 122 interfaces with the memory 124 and executes the processor-executable instructions to perform the aforementioned steps 402, 404 . . . 450.

From the foregoing, the skilled person having the foregoing teaching will readily appreciate that the monitor and control system 118 of the present invention is configured to dynamically change the mobile-based controllers 110 on mobile vessels 102 based upon the number of active mobile vessels 102 and the available bandwidth per satellite region 114a, 114b and 114c. In addition, the skilled person would appreciate that the monitor and control unit 118 by receiving the location (GPS) coordinates from any one of the mobile vessel 102 and then mapping the mobile vessel 102 to the serving satellite region 114a, 114b or 114c will provide accurate results most of the time. However, the skilled person should appreciate that there may be cases when a mobile vessel 102 is in an area where two or more of the satellite regions 114a, 114b, and 114c can overlap one another and as a result the determination of the actual serving satellite region can be a challenge when based upon location (GPS) coordinates alone. To address this concern, the monitoring and control unit 118 can either automatically have or request the mobile vessels 102 to indicate their actual serving satellite region 114a, 114b, or 114c when they provide their location (GPS) coordinates. Furthermore, the skilled person should appreciate that the monitor and control unit 118 can be used with any type of communication system such as, for example, a 2G GSM communication system (described herein) and 3G/4G GSM communication systems. The present invention has several advantages some of which are as follows:

1. The dynamic changing of radio capabilities based upon number of active vessels 102 and available transport bandwidth provides an efficient, cost effective, usage of the high cost satellite link. It also provides an increased performance of M2M device communications and improved voice service.

2. The present invention is an effective solution allowing dynamic radio configurations (e.g., GSM radio configurations) to take advantage of the available satellite transport.

3. The present invention improves the performance for both voice and M2M device applications. Plus, provides the capability to support additional circuit switched (CS) and packet switched (PS) traffic for the scenarios where all supported mobile vessels 102 are not currently active.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A monitor and control unit associated with a land-based controller and a plurality of satellites, where each satellite has a satellite region within which there is provided voice and data capabilities to one or more mobile vessels located in the respective satellite region, and where each mobile vessel has a mobile-based controller, the monitor and control unit is configured to:
   store location information for each satellite region;
   receive location information for each mobile vessel;
   analyze the location information for each mobile vessel and the location information for each satellite region to determine a number of mobile vessels located in each satellite region;
   determine an available transport bandwidth for each mobile vessel in each satellite region; and
   interface with each mobile-based controller located on each mobile vessel through the land-based controller to dynamically configure each mobile-based controller to support a predetermined number of voice calls and a predetermined bit rate for data communications based on the respective available transport bandwidth that was determined for the respective mobile vessel.

2. The monitor and control unit of claim 1, further configured to determine the available transport bandwidth for each mobile vessel located in each satellite region based on a total transport bandwidth supported in each satellite region.

3. The monitor and control unit of claim 1, further configured to monitor when a number of mobile vessels located within one of the satellite regions decreases and then dynamically reconfigure each mobile-based controller located on each mobile vessel which is remaining within the one satellite region to have increased voice and data capabilities.

4. The monitor and control unit of claim 1, further configured to monitor when a number of mobile vessels located within one of the satellite regions increases and then dynamically reconfigure each mobile-based controller located on each mobile vessel which is remaining within the one satellite region to have decreased voice and data capabilities.

5. The monitor and control unit of claim 1, wherein the location information for each mobile vessel are Global Positioning Satellite (GPS) coordinates.

6. The monitor and control unit of claim 1, wherein:
   the land-based controller is a base station controller; and
   the mobile-based controllers are radio base station controllers.

7. The monitor and control unit of claim 1, wherein a company operates the one or more mobile vessels, wherein the available transport bandwidth for each mobile vessel located in each satellite region is determined based on a total transport bandwidth supported in each satellite region, and wherein the total transport bandwidth that is supported in each satellite region is acquired by the company.

8. The monitor and control unit of claim 7, wherein when there is one mobile vessel in one satellite region then the one mobile vessel has the corresponding mobile-based controller dynamically configured to utilize all of the total transport bandwidth supported in the one satellite region, and when there are multiple mobile vessels in the one satellite region then the multiple mobile vessels have their corresponding mobile-based controllers dynamically configured to utilize a predetermined share of the total transport bandwidth supported in the one satellite region whereby the multiple mobile vessels and their corresponding mobile-based controllers are collectively configured to utilize all of the total transport bandwidth supported in the one satellite region.

9. A method implemented by a monitor and control unit which is associated with a land-based controller and a plurality of satellites, where each satellite has a satellite region within which there is provided voice and data capabilities to one or more mobile vessels located in the respective satellite region, and where each mobile vessel has a mobile-based controller, the method comprising the following steps:
   storing location information for each satellite region;
   receiving location information for each mobile vessel;
   analyzing the location information for each mobile vessel and the location information for each satellite region to determine a number of mobile vessels located in each satellite region;
   determining an available transport bandwidth for each mobile vessel in each satellite region; and
   interfacing with each mobile-based controller located on each mobile vessel through the land-based controller to dynamically configure each mobile-based controller to support a predetermined number of voice calls and a predetermined bit rate for data communications based on the respective available transport bandwidth that was determined for the respective mobile vessel.

10. The method of claim 9, further comprising the step of determining the available transport bandwidth for each mobile vessel in each satellite region based on a total transport bandwidth supported in each satellite region.

11. The method of claim 9, further comprising the step of monitoring when a number of mobile vessels located within one of the satellite regions decreases then dynamically reconfigure each mobile-based controller located on each mobile vessel which is remaining within the one satellite region to have increased voice and data capabilities.

12. The method of claim 9, further comprising the step of monitoring when a number of mobile vessels located within one of the satellite regions increases then dynamically reconfigure each mobile-based controller located on each mobile vessel which is remaining within the one satellite region to have decreased voice and data capabilities.

13. The method of claim 9, wherein the location information for each mobile vessel are Global Positioning Satellite (GPS) coordinates.

14. The method of claim 9, wherein:
   the land-based controller is a base station controller; and
   the mobile-based controllers are radio base station controllers.

15. The method of claim 9, wherein a company operates the one or more mobile vessels, wherein the available transport bandwidth for each mobile vessel located in each satellite region is determined based on a total transport bandwidth supported in each satellite region, and wherein the total transport bandwidth that is supported in each satellite region is acquired by the company.

16. The method of claim 15, wherein when there is one mobile vessel in one satellite region then the one mobile vessel has the corresponding mobile-based controller dynamically configured to utilize all of the total transport bandwidth supported in the one satellite region, and when there are multiple mobile vessels in the one satellite region then the multiple mobile vessels have their corresponding mobile-based controllers dynamically configured to utilize a predetermined share of the total transport bandwidth supported in the one satellite region whereby the multiple mobile vessels and their corresponding mobile-based controllers are collectively configured to utilize all of the total transport bandwidth supported in the one satellite region.

17. A method implemented by a monitor and control unit which is associated with a land-based controller and a plurality of satellites, where each satellite has a satellite region within which there is provided voice and data capabilities to one or more mobile vessels located in the respective satellite region, and where each mobile vessel has a mobile-based controller, the method comprising the following steps:
   receiving location information for one of the mobile vessels which has located thereon a mobile-based controller;
   determining if the mobile vessel is already being monitored;
   when the result of the first determining step is no, then initiating a monitoring process which results in dynamically configuring the mobile-based controller of the mobile vessel and other mobile-based controllers of other mobile vessels if any which are located in same satellite region to provide voice and data capabilities based on an available transport bandwidth that was determined for the mobile vessel and the other mobile vessels;
   when the result of the first determining step is yes, then determining if the mobile vessel has an active cellular service;
   when the result of the second determining step is no, then ending process; and
   when the result of the second determining step is yes, then determining if the mobile vessel has moved from an old satellite region to a new satellite region;
   when the result of the third determining step is no, then ending process; and
   when the result of the third determining step is yes, then initiating a modifying monitor process to perform the following steps:
      dynamically configuring the mobile-based controller of the mobile vessel and other mobile-based controllers of other mobile vessels if any which are located in the new satellite region to provide voice and data capabilities based on an available transport bandwidth that was determined for the mobile vessel and the other mobile vessels if any located in the new satellite region; and
      dynamically configuring other mobile-based controllers of other mobile vessels if any which are located in the old satellite region to provide voice and data capabilities based on an available transport bandwidth that was determined for the other mobile vessels if any located in the old satellite region.

18. The method of claim 17, wherein the monitoring process comprises the steps of:
   identifying the satellite region in which the mobile vessel is currently located;

incrementing a supported number of mobile vessels in the identified satellite region;
determining the available transport bandwidth for the mobile vessel and the other mobile vessels if any located in the identified satellite region;
determining a configuration for the mobile-based controller of the mobile vessel and the other mobile-based controllers of the other mobile vessels if any located in the identified satellite region;
initiating the determined configuration in the mobile-based controller of the mobile vessel;
determining if other mobile vessels are active in the identified satellite region and when no then end and when yes then initiating the determined configuration in the mobile-based controllers of the other mobile vessels active in the identified satellite region.

19. The method of claim 17, wherein the modifying monitor process further comprises the steps of:
determining the available transport bandwidth for the mobile vessel and the other mobile vessels if any located in the new satellite region;
determining a configuration for the mobile-based controller of the mobile vessel and the other mobile-based controllers of the other mobile vessels if any located in the new satellite region;
initiating the determined configuration in the mobile-based controller of the mobile vessel located in the new satellite region;
determining the available transport bandwidth for the other mobile vessels if any located in the old satellite region;
determining a configuration for the other mobile-based controllers of the other mobile vessels if any located in the old satellite region based on the determined available transport bandwidths;
determining if the other mobile vessels in the new satellite region are active;
when there are other mobile vessels in the new satellite region which are active, then initiating the determined configuration in the other mobile-based controllers of the other mobile vessels which are active and located in the new satellite region; and
when there are no other mobile vessels in the new satellite region which are active or after the initiating the determined configuration in the other mobile-based controllers of the other mobile vessels which are active and located in the new satellite region, then determining if the other mobile vessels in the old satellite region are active and when no then end and when yes then initiating the determined configuration in the other mobile-based controllers of the other mobile vessels which are active and located in the old satellite region.

20. The method of claim 17, wherein:
the land-based controller is a base station controller; and
the mobile-based controllers are radio base station controllers.

21. A monitor and control unit associated with a land-based controller and a plurality of satellites where each satellite has a satellite region within which there is provided voice and data capabilities to one or more mobile vessels located in the respective satellite region, each mobile vessel has a mobile-based controller, the monitor and control unit is configured to:
receive location information for one of the mobile vessels which has located thereon a mobile-based controller;
determine if the mobile vessel is already being monitored;
when the result of the first determine operation is no, then initiate a monitoring process which results in dynamically configuring the mobile-based controller of the mobile vessel and other mobile-based controllers of other mobile vessels if any which are located in same satellite region to provide voice and data capabilities based on an available transport bandwidth that was determined for the mobile vessel and the other mobile vessels;
when the result of the first determine operation is yes, then determine if the mobile vessel has an active cellular service
when the result of the second determine operation is no, then end process; and
when the result of the second determine operation is yes, then determine if the mobile vessel has moved from an old satellite region to a new satellite region;
when the result of the third determine operation is no, then end process; and
when the result of the third determine operation is yes, then initiating a modifying monitor process to perform following operations:
dynamically configuring the mobile-based controller of the mobile vessel and other mobile-based controllers of other mobile vessels if any which are located in the new satellite region to provide voice and data capabilities based on an available transport bandwidth that was determined for the mobile vessel and the other mobile vessels if any located in the new satellite region; and
dynamically configure other mobile-based controllers of other mobile vessels if any which are located in the old satellite region to provide voice and data capabilities based on an available transport bandwidth that was determined for the other mobile vessels if any located in the old satellite region.

22. The monitor and control unit of claim 21, further configured to perform the monitoring process as follows:
identify the satellite region in which the mobile vessel is currently located;
increment a supported number of mobile vessels in the identified satellite region;
determine the available transport bandwidth for the mobile vessel and the other mobile vessels if any located in the identified satellite region;
determine a configuration for the mobile-based controller of the mobile vessel and the other mobile-based controllers of the other mobile vessels if any located in the identified satellite region;
initiate the determined configuration in the mobile-based controller of the mobile vessel;
determine if other mobile vessels are active in the identified satellite region and when no then end and when yes then initiate the determined configuration in the mobile-based controllers of the other mobile vessels active in the identified satellite region.

23. The monitor and control unit of claim 21, further configured to perform the modifying monitor process as follows:
determine the available transport bandwidth for the mobile vessel and the other mobile vessels if any located in the new satellite region;
determine a configuration for the mobile-based controller of the mobile vessel and the other mobile-based controllers of the other mobile vessels if any located in the new satellite region;
initiate the determined configuration in the mobile-based controller of the mobile vessel located in the new satellite region;

determine the available transport bandwidth for the other mobile vessels if any located in the old satellite region;

determine a configuration for the other mobile-based controllers of the other mobile vessels if any located in the old satellite region based on the determined available transport bandwidths;

determine if the other mobile vessels in the new satellite region are active when there are other mobile vessels in the new satellite region which are active then initiate the determined configuration in the other mobile-based controllers of the other mobile vessels which are active and located in the new satellite region; and when there are no other mobile vessels in the new satellite region which are active or after the initiating of the determined configuration in the other mobile-based controllers of the other mobile vessels which are active and located in the new satellite region, then determine if the other mobile vessels in the old satellite region are active and when no then end and when yes then initiate the determined configuration in the other mobile-based controllers of the other mobile vessels which are active and located in the old satellite region.

24. The monitor and control unit of claim 21, wherein:

the land-based controller is a base station controller; and the mobile-based controllers are radio base station controllers.

\* \* \* \* \*

UNITED STATES PATENT AND TRADEMARK OFFICE
CERTIFICATE OF CORRECTION

| | | |
|---|---|---|
| PATENT NO. | : 8,805,390 B2 | Page 1 of 1 |
| APPLICATION NO. | : 13/348711 | |
| DATED | : August 12, 2014 | |
| INVENTOR(S) | : Swardh et al. | |

It is certified that error appears in the above-identified patent and that said Letters Patent is hereby corrected as shown below:

Specification

In Column 3, Line 15, delete "data in" and insert -- data --, therefor.

In Column 6, Line 33, delete "mobile and control unit 118" and insert -- monitor and control unit 118 --, therefor.

In Column 6, Line 37, delete "mobile and control unit 118" and insert -- monitor and control unit 118 --, therefor.

In Column 7, Line 38, delete "GPS coordinates)" and insert -- (e.g., GPS coordinates) --, therefor.

Signed and Sealed this
Second Day of August, 2016

Michelle K. Lee
*Director of the United States Patent and Trademark Office*